(12) United States Patent
Liu et al.

(10) Patent No.: US 11,953,402 B2
(45) Date of Patent: Apr. 9, 2024

(54) INERTIA BRAKING TEST SYSTEM AND CONTROL METHOD THEREOF

(71) Applicant: Changchun Automotive Test Center Co., Ltd., Changchun (CN)

(72) Inventors: Yang Liu, Changchun (CN); Chao Niu, Changchun (CN); Yongchuang Wang, Changchun (CN); Bin Liang, Changchun (CN); Jingtao Zhang, Changchun (CN); Hui Jia, Changchun (CN); Peng Su, Changchun (CN); Wanli Hu, Changchun (CN)

(73) Assignee: Changchun Automotive Test Center Co., Ltd., Changchun (CN)

(*) Notice: Subject to any disclaimer, the term of this patent is extended or adjusted under 35 U.S.C. 154(b) by 0 days.

(21) Appl. No.: 18/453,528

(22) Filed: Aug. 22, 2023

(65) Prior Publication Data

US 2024/0068911 A1 Feb. 29, 2024

Related U.S. Application Data

(63) Continuation-in-part of application No. 18/355,410, filed on Jul. 19, 2023, now abandoned.

(30) Foreign Application Priority Data

Aug. 23, 2022 (CN) .......................... 202211011608.5

(51) Int. Cl.
 *G01M 17/007* (2006.01)
(52) U.S. Cl.
 CPC .................................. *G01M 17/007* (2013.01)

(58) Field of Classification Search
 None
 See application file for complete search history.

(56) References Cited

U.S. PATENT DOCUMENTS

| | | | | |
|---|---|---|---|---|
| 9,150,201 | B2* | 10/2015 | Smith | B60T 8/1708 |
| 10,739,217 | B2* | 8/2020 | Hardy | G07C 5/08 |
| 11,084,342 | B2* | 8/2021 | Reed | G01L 5/136 |
| 2013/0253814 | A1* | 9/2013 | Wirthlin | B60D 1/62 |
| | | | | 701/1 |
| 2019/0092310 | A1* | 3/2019 | Vinci | B60T 17/22 |
| 2021/0370892 | A1* | 12/2021 | Stearns | B60D 1/242 |

FOREIGN PATENT DOCUMENTS

KR 101415647 B1 * 7/2014

* cited by examiner

*Primary Examiner* — Adam D Tissot
*Assistant Examiner* — Garrett F Evans
(74) *Attorney, Agent, or Firm* — Howard IP Law Group

(57) ABSTRACT

An inertia braking test system and a control method is provided, wherein the inertia braking test system is composed of an inertia brake test system, a sensor system and a tested object. An actuating device is connected with the inertia brake control device through a ball stud. The actuation function of the inertia brake control device with two degrees of freedom along the front-and-rear direction and the up-and-down direction of the vehicle is realized. The movable chassis realizes the mobile function of the system. The acceleration sensor can sense the acceleration of the movable chassis. Each force is tested by the first force sensor, the second force sensor and the third force sensor. The displacement data is measured by the first displacement sensor and the second displacement sensor, so that a movable brake system test is achieved.

10 Claims, 2 Drawing Sheets

INERTIA BRAKING TEST SYSTEM AND CONTROL METHOD THEREOF

CROSS-REFERENCE TO RELATED APPLICATION

This patent disclosure is a continuation-in-part of U.S. patent application Ser. No. 18/355,410 filed on Jul. 19, 2023 and claims the benefit and priority of Chinese Patent Application No. 202211011608.5, filed with the China National Intellectual Property Administration on Aug. 23, 2022, the disclosures of which are incorporated by reference herein in its entirety as part of the present disclosure.

TECHNICAL FIELD

The present disclosure relates to the technical field of braking testing, in particular to an inertia braking test system and a control method thereof.

BACKGROUND

Brake system testing is a test flow for measuring braking torque of a brake. In the two items of L.4 Requirements on the Control Device and L.5 Test and Measurement of the Control Device defined by the appendix of national standard GB12676-2014 Technical Requirements and Test Methods for Commercial Vehicle Braking, the technical requirements on the inertia braking control device and the required test items are specified. In the item of L.7 Test and Measurement on the Brake, the technical requirements of the inertia braking brake and the required test items are specified. In the test flow, there is no mature test equipment or test method for the test of the inertia braking control device in the two items of L.4 Requirements on the Control Device and L.5 Test and Measurement of the Control Device in the existing test means. For the item of L.7 Test and Measurement on the Brake, although the braking torque of the brake can be measured by the inertia test table or the chassis dynamometer, the two schemes need fixed test sites. The test function cannot be realized when the test vehicles cannot be transported to the test sites, and improvements are needed.

SUMMARY

The present disclosure aims to solve the defects in the prior art, and provides an inertia braking test system and a control method thereof.

In order to achieve the above purpose, the present disclosure adopts the following technical scheme. An inertia braking test system is composed of an inertia brake test system, a sensor system and a tested object. The inertia brake test system includes a control system, an actuating device, a communication unit, a human-machine interaction unit and an energy storage system. The sensor system includes a first force sensor, a second force sensor, a third force sensor, a first displacement sensor, a second displacement sensor, an acceleration sensor and a movable chassis. The tested object includes an inertia brake control device, a connecting device and a brake.

In order to provide stable support for the inertia brake test system and the sensor system, the improvement of the present disclosure lies in that the movable chassis is a wheeled chassis. The upper surface of the movable chassis is provided with a support. The inertia brake test system and the sensor system are fixedly connected with the support.

In order to realize the actuation function of the control device with two degrees of freedom along the front-and-rear direction and the up-and-down direction of a vehicle, the improvement of the present disclosure lies in that the output end of the inertia brake control device is provided with a ball stud. The ball stud is connected with the input end of the actuating device.

In order to realize the control function of the inertia brake control device for the brake, the improvement of the present disclosure lies in that the inertia brake control device is connected with the connecting device. The connecting device is connected with the brake.

In order to realize the energy supply function of the energy storage system, the improvement of the present disclosure lies in that the energy storage system is composed of a rechargeable battery. The output end of the energy storage system is electrically connected with input ends of the control system and the actuating device. The output end of the control system is electrically connected with an input end of the communication unit, and with input ends of the actuating device and the sensor system via a bus.

In order to realize signal transmission function of the sensor system, in the present disclosure, the control system is in signal connection with the sensor system.

In order to realize the signal conversion, input and output functions of the communication unit, the improvement of the present disclosure lies in that the output end of the communication unit is signal connected with the input end of the man-machine interaction unit.

In order to realize the measurement function of the force, the improvement of the present disclosure lies in that the first force sensor is installed between the actuating device and the inertia brake control device. The second force sensor is installed between the inertia brake control device and the connecting device. The third force sensor is installed between the connecting device and the brake.

In order to realize the measurement function of the displacement, the improvement of the present disclosure lies in that the first displacement sensor is installed between the first force sensor and the inertia brake control device. The second displacement sensor is installed between the second force sensor and the connecting device.

In order to realize the measurement function of acceleration, the improvement of the present disclosure lies in that the acceleration sensor is fixedly connected with the movable chassis.

Disclosed is a control method of the inertia braking test system, including the following steps:
  S1, firstly, connecting the actuating device with the inertia brake control device through the ball stud to realize the actuation function of the inertia brake control device with two degrees of freedom along the front-and-rear direction and the up-and-down direction of a vehicle;
  S2, supplying power to the control system through the energy storage unit, and distributing the power to the communication unit, the actuating device and the sensor system through the control system so as to achieve the control function of the control system;
  S3, transmitting communication signals to the communication unit through the human-machine interaction unit, and delivering the communication signals to the control system by the communication unit for specific control through the control system;
  S4, measuring the actuating force of the inertia brake in the horizontal direction through the first force sensor, measuring the output force of the inertia brake actuating device by the second force sensor, measuring force transmitted from the connecting device to the brake by the third force sensor, measuring the displacement of the inertia brake control device by the first displacement sensor, measuring the displacement of the connecting device by the second displacement sensor, and measuring the motion acceleration of the movable chassis by the acceleration sensor; and S5, receiving measurement signals output by each sensor in the sensor system by the control system, digitalizing the measurement signals, and sending processing results to the human-machine interaction unit through the communication unit.

Compared with the prior art, the present disclosure has following advantages and beneficial effects.

In the present disclosure, the actuating device is connected with the inertia brake control device through the ball stud. The actuation function of the inertia brake control device with two degrees of freedom along the front-and-rear direction and the up-and-down direction of the vehicle is realized. The movable chassis realizes the mobile function of the system. The acceleration sensor can sense the acceleration of the movable chassis. Each force is tested by the first force sensor, the second force sensor and the third force sensor. The displacement data is measured by the first displacement sensor and the second displacement sensor, so that a movable brake system test is achieved, the accuracy is ensured, and the technical problem that the test function cannot be realized when the test vehicle cannot be transported to the test site in the traditional brake system test.

DETAILED DESCRIPTION OF THE EMBODIMENTS

In order to make the objectives, technical solutions and advantages of the present disclosure clearer, the present disclosure will be further described hereinbelow with reference to the attached figures and embodiments thereof. It shall be understood that, the embodiments described herein are only intended to illustrate but not to limit the present disclosure.

In the description of the present disclosure, it needs to be illustrated that the indicative direction or position relations of the terms such as "length", "width", "upper", "lower", "front", "rear", "left", "right", "vertical", "horizontal", "top", "bottom", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure. In the description of the present disclosure, the meaning of "a plurality of" means two or more unless expressly specifically defined otherwise.

Embodiment I

Figure 1:
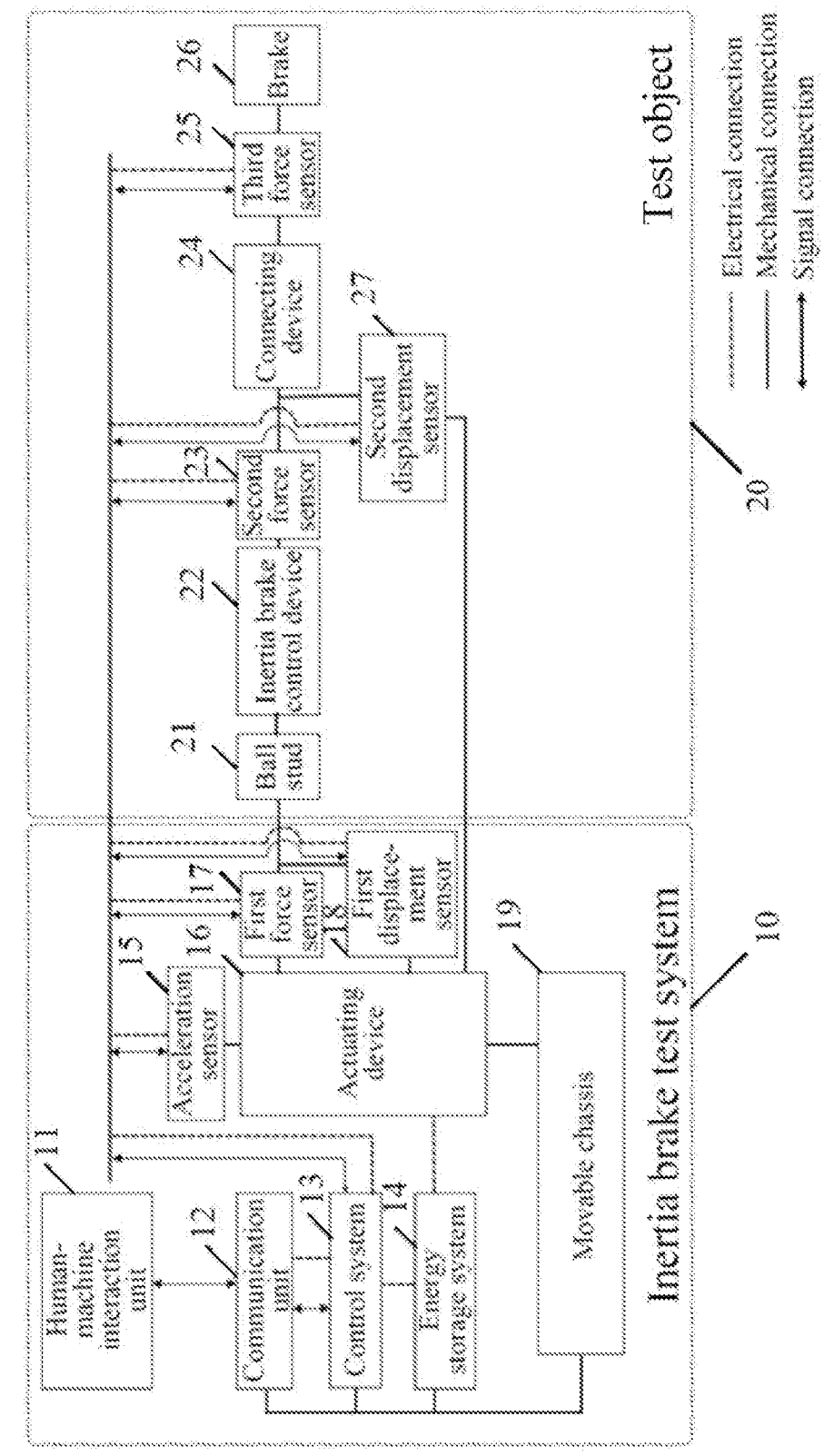
FIG. 1 is a system program flow diagram of an inertia braking test system and a control method thereof proposed by the present disclosure.
Figure 2:
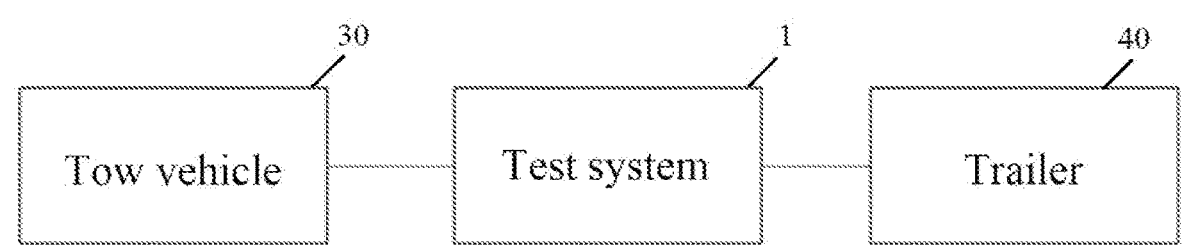
FIG. 2 is a working principle diagram of an inertia braking test system and a control method thereof proposed by the present disclosure.

Referring to FIG. 1 to FIG. 2, the present disclosure provides the following technical scheme. An inertia braking test system 1 is composed of an inertia brake test system 10, a sensor system and a tested object 20. The inertia brake test system 10 includes a control system 13, an actuating device 16, a communication unit 12, a human-machine interaction unit 11, an energy storage system 14 and a movable chassis 19. The sensor system includes a first force sensor 17, a second force sensor 23, a third force sensor 25, a first displacement sensor 18, a second displacement sensor 23 and an acceleration sensor 15. The tested object 20 includes an inertia brake control device 22, a connecting device 24 and a brake 26.

Referring to FIG. 1, the movable chassis 19 is a wheeled chassis. In one or more embodiments, the movable chassis 19 is composed of a chassis frame and wheels. The chassis frame is a mechanical fixed frame structure. Wheels each are connected with the chassis frame via a bearing and a bearing seat, so that the chassis can move on the ground. The upper surface of the movable chassis 19 is provided with a support. The inertia brake test system 10 and the sensor system are fixedly connected with the support. The purpose of this design is to limit the moving mode of the movable chassis 19, and provide stable support for the inertia brake test system 10 and the sensor system through the support, so that the inertia brake test system and the sensor system can move with the movement of the movable chassis 19.

Referring to FIG. 1, the output end of the inertia brake control device 22 is provided with a ball stud 21. In one or more embodiments, the ball stud 21 is assembled from a spherical stud and an integral ball socket. The ball stud 21 can realize angle variation between two connected objects. The ball stud 21 is connected with the input end of the actuating device 16. The ball stud 21 can realize the actuation function of the inertia brake control device with two degrees of freedom along the front-and-rear direction and the up-and-down direction of a vehicle. In one or more embodiments, the actuating device 16 can be a nut-and-screw mechanism driven by a motor. The screw is fixed on a floor of the actuating device 16 via a bearing and a bearing seat. The motor is mechanically connected with the screw. When being started, the motor drives the screw to rotate, thereby driving the nut move forward and backward.

Referring to FIG. 1, the structure of the inertia brake control device 22 is designed by manufacturer. The inertia brake control device 22 is connected with the connecting device 24. In some embodiments, the connecting device 24 may be a connecting rod or a connecting rope. The connecting device 24 is connected with the brake 26. The connecting device 24 can realize the control function of the inertia brake control device 22 for the brake 26. The brake 26 may be a drum brake or a disc brake.

Referring to FIG. 1, the energy storage system 14 is composed of a rechargeable battery. In some embodiments, the rechargeable battery may be a ternary lithium ion battery. The output end of the energy storage system 14 is electrically connected with the input end of the control system 13. In some embodiments, the control system 13 may be a single-chip microcomputer. The output end of the control system 13 is electrically connected with the input ends of the communication unit 12, the actuating device 16 and the sensor system. The rechargeable battery can store electric energy. The energy storage system 14 supplies power to the control system 13. The control system 13 distributes the electric energy to the communication unit 12, the actuating device 16 and the sensor system, so that the control function of the control system 13 is achieved.

Referring to FIG. 1, in one or more embodiments, the communication unit 12 is a communication module in a form of a single-chip microcomputer. The communication protocol of the communication unit 12 adopts a 485 bus communication. The output end of the communication unit 12 is connected with the input end of the human-machine interaction unit 11. The communication unit 12 can realize the conversion, input and output functions of communication signals. In one or more embodiments, the human-machine interaction unit 11 is composed of a computer, a display, a mouse and a keyboard. Operator can control the test system and observe the test result, through the human-machine interaction unit 11.

Referring to FIG. 1, in one or more embodiments, the first force sensor 17, the second force sensor 23 and the third force sensor 25 each can be a strain gauge tension measuring sensor or a strain gauge pressure measuring sensor, which is provided with threaded connection at two ends thereof and can measure a tension or a pressure applied on the two ends. The first force sensor 17 is installed between the actuating device 16 and the inertia brake control device 22. The second force sensor 23 is installed between the inertia brake control device 22 and the connecting device 24. The third force sensor 25 is installed between the connecting device 24 and the brake 26. The first force sensor 17 can measure the actuating force of the inertia brake in the horizontal direction. The second force sensor 23 can measure the output force of the actuating device 22 of the inertia brake. The third force sensor 25 can measure force transmitted from the connecting device 24 to the brake 26.

Referring to FIG. 1, in one or more embodiments, the first displacement sensor 18 and the second displacement sensor 27 each can be a draw-wire displacement sensor. The input end of the draw wire is connected with a tested object, and can be stretched or shortened with movement of the tested object, and thus the draw-wire displacement sensor can measure a displacement distance of the tested object. The first displacement sensor 18 is installed between the first force sensor 17 and the inertia brake control device 22, and can measure a displacement distance of the inertia brake control device 22. The second displacement sensor 27 is installed between the second force sensor 23 and the connecting device 24. The first displacement sensor 18 can measure the displacement of the inertia brake control device 22. The second displacement sensor 27 can measure the displacement of the connecting device 24.

Referring to FIG. 1, in one or more embodiments, the acceleration sensor 15 can be a piezoelectric acceleration sensor. The acceleration sensor 15 is fixedly connected with the actuating device 16. The acceleration sensor 15 can measure the motion acceleration of the movable chassis 19.

Referring to FIG. 2, a control method of the inertia braking test system 1, including the following steps:

S1, firstly, connecting the actuating device 16 with the inertia brake control device 22 through the ball stud 21 to realize the actuation function of the inertia brake control device 22 with two degrees of freedom along the front-and-rear direction and the up-and-down direction of a vehicle;

S2, supplying power to the control system 13 through the energy storage system 14, and distributing the power to the communication unit 12, the actuating device 16 and the sensor system through the control system 13 so as to achieve the control function of the control system 13;

S3, transmitting communication signals to the communication unit 12 through the human-machine interaction unit 11, and delivering the communication signals to the control system 13 by the communication unit 12 for specific control through the control system 13;

S4, measuring the actuating force of the inertia brake in the horizontal direction through the first force sensor 17, measuring the output force of the inertia brake actuating device 16 by the second force sensor 23, measuring force transmitted to the brake 26 by the connecting device 24 by the third force sensor 25, measuring the displacement of the inertia brake control device 22 by the first displacement sensor 18, measuring the displacement of the connecting device 24 by the second displacement sensor 27, and measuring the motion acceleration of the movable chassis 19 by the acceleration sensor 15; and S5, receiving measurement signals output by each sensor in the sensor system by the control system 13, digitalizing the measurement signals, and sending processing results to the human-machine interaction unit 11 through the communication unit 12.

Referring to FIG. 2, optionally, a working mode of the inertia braking test system 1 is described now. A tow vehicle 30, an inertia braking test system 1 and a trailer 40 provided with a tested object 20 are connected together. The inertia braking test system 1 is located between the tow vehicle 30 and the trailer 40, and is fixedly connected with the tow vehicle 30 through the movable chassis 19 and connected with the trailer 40 through the ball stud 21. The tow vehicle 30 tows the inertia braking test system 10 to move forward or backward, and the inertia braking test system 1 tows the trailer 40 to move forward or backward.

The working principle is as follows. In the measurement process, firstly, the actuating device 16 is connected with the inertia brake control device 22 through the ball stud 21. The actuation function of the inertia brake control device 22 with two degrees of freedom along the front-and-rear direction and the up-and-down direction of the vehicle is realized, and then the energy storage system 14 supplies power to the control system 13. The control system 13 distributes the power to the communication unit 12, the actuating device 16 and the sensor system, so that the control function of the control system 13 is achieved. In operation, the user transmits communication signals to the communication unit 12 through the human-machine interaction unit 11. The communication unit 12 delivers the communication signals to the control system 13. Specific control is carried out through the control system 13. The first force sensor 17 measures the actuating force of the inertia brake in the horizontal direction. The second force sensor 23 measures the output force of the inertia brake actuating device 16. The third force sensor 25 measures force transmitted from the connecting device 24 to the brake 26. The first displacement sensor 18 measures the displacement of the inertia brake control device 22. The second displacement sensor 27 measures the displacement of the connecting device 24. The acceleration sensor 15 measures the motion acceleration of the movable chassis 19. Finally, the control system 13 receives the measurement signals output by each sensor in the sensor system, digitalizes the measurement signals, and sends processing results to the human-machine interaction unit 11 through the communication unit 12.

In conclusion, the above is only the preferred embodiment of the present disclosure, but does not limit the present disclosure in other forms. Those skilled in the art may change or modify the technical contents disclosed above into equivalent embodiments in other fields. However, any simple modification, equivalent changes and modifications made to the above embodiments according to the technical essence of the present disclosure still belong to the protection scope of the present technical scheme.

What is claimed is:

1. An inertia braking test system, wherein the inertia braking test system is composed of an inertia brake test system, a sensor system, a tested object and a movable chassis, wherein
the inertia brake test system comprises a control system, an actuating device, a communication unit, a human-machine interaction unit and an energy storage system, the sensor system comprises a first force sensor, a second force sensor, a third force sensor, a first displacement sensor, a second displacement sensor and an acceleration sensor, and the tested object comprises an inertia brake control device, a connecting device and a brake.

2. The inertia braking test system according to claim 1, wherein the movable chassis is a wheeled chassis, an upper surface of the movable chassis is provided with a support, and the inertia brake test system and the sensor system are fixedly connected with the support.

3. The inertia braking test system according to claim 1, wherein an output end of the inertia brake control device is provided with a ball stud, and wherein the ball stud is connected with an input end of the actuating device.

4. The inertia braking test system according to claim 1, wherein the inertia brake control device is connected with the connecting device, and the connecting device is connected with the brake.

5. The inertia braking test system according to claim 1, wherein the energy storage system is composed of a rechargeable battery, an output end of the energy storage system is electrically connected with an input end of the control system, and an output end of the control system is electrically connected with input ends of the communication unit, the actuating device and the sensor system.

6. The inertia braking test system according to claim 1, wherein an output end of the communication unit is in signal connection with an input end of the human-machine interaction unit.

7. The inertia braking test system according to claim 1, wherein the first force sensor is installed between the actuating device and the inertia brake control device, the second force sensor is installed between the inertia brake control device and the connecting device, and the third force sensor is installed between the connecting device and the brake.

8. The inertia braking test system according to claim 1, wherein the first displacement sensor is installed between the first force sensor and the inertia brake control device, and the second displacement sensor is installed between the second force sensor and the connecting device.

9. The inertia braking test system according to claim 1, wherein the acceleration sensor is fixedly connected with the movable chassis.

10. A control method of an inertia braking test system, comprising:
connecting an actuating device with an inertia brake control device through a ball stud to realize an actuation function of the inertia brake control device with two degrees of freedom along a front-and-rear direction and an up-and-down direction of a vehicle;
supplying power to a control system through an energy storage unit, and distributing the power to a communication unit, the actuating device and a sensor system through the control system so as to achieve a control function of the control system, wherein the sensor system comprises a first force sensor, a second force sensor, a third force sensor, a first displacement sensor, a second displacement sensor and an acceleration sensor;
transmitting communication signals to the communication unit through a human-machine interaction unit, and delivering the communication signals to the control system by the communication unit for control through the control system;
measuring an actuating force of an inertia brake in a horizontal direction through the first force sensor, measuring an output force of the actuating device by the second force sensor, measuring force transmitted to the inertia brake by a connecting device by the third force sensor, measuring displacement of the inertia brake control device by the first displacement sensor, measuring displacement of the connecting device by the second displacement sensor, and measuring motion acceleration of a movable chassis by the acceleration sensor; and
receiving, by the control system, measurement signals output from one or more of said first force sensor, said second force sensor, said third force sensor, said first displacement sensor, said second displacement sensor and said acceleration sensor, digitalizing the measurement signals, and sending processing results to the human-machine interaction unit through the communication unit.

* * * * *